Aug. 11, 1942.　　　　W. V. SMITH　　　　2,292,777
METHOD OF AND APPARATUS FOR MAKING TIRE TREADS
Filed Feb. 3, 1940

INVENTOR.
WALTER V. SMITH
BY
Chapin & Neal
ATTORNEYS.

Patented Aug. 11, 1942

2,292,777

UNITED STATES PATENT OFFICE 2,292,777

METHOD OF AND APPARATUS FOR MAKING TIRE TREADS

Walter V. Smith, South Hadley Falls, Mass., assignor to United States Rubber Company, New York, N. Y., a corporation of New Jersey Application February 3, 1940, Serial No. 317,111

8 Claims. (Cl. 154—9)

This invention relates to a method of and apparatus for manufacturing treads for penumatic tire casings. More particularly it relates to a method of forming treads of the type in which ribbon-like inserts of soft rubber material are positioned edgewise in the road-engaging surface of the tread.

It is one object of my invention to provide a method of making treads of this character and simultaneously with the insertion of the inserts provide a cushion strip on the underside of the tread to which the inserts are integrally united, and to provide apparatus for carrying out said method. Other and further objects will be apparent from the following specification and claims.

Figure 1:
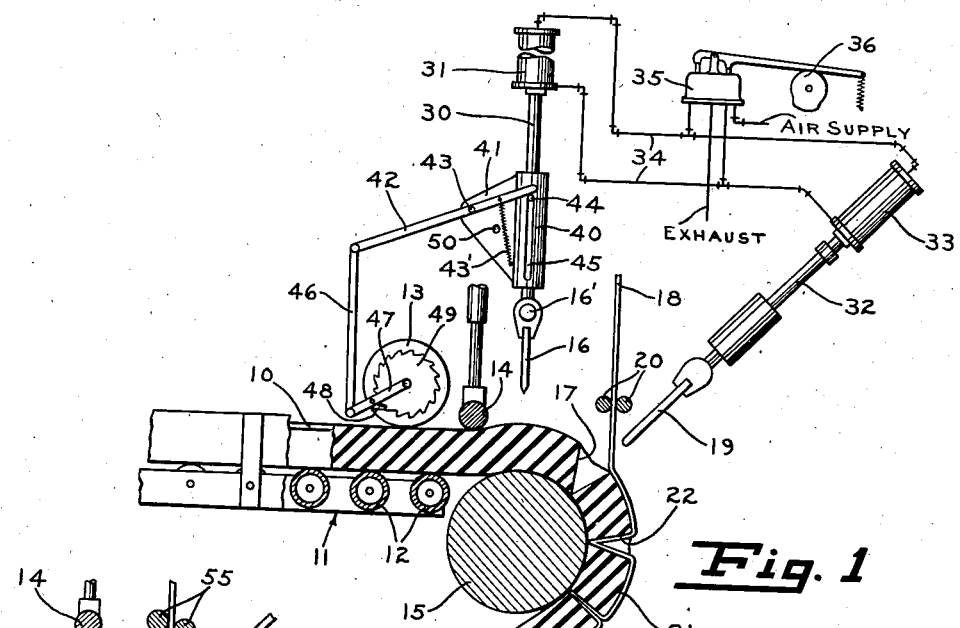
Figure 2:
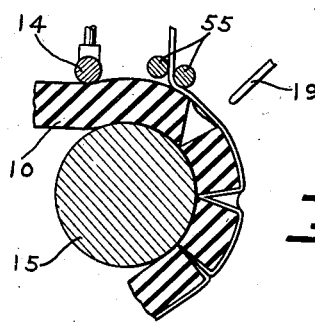
Figure 3:
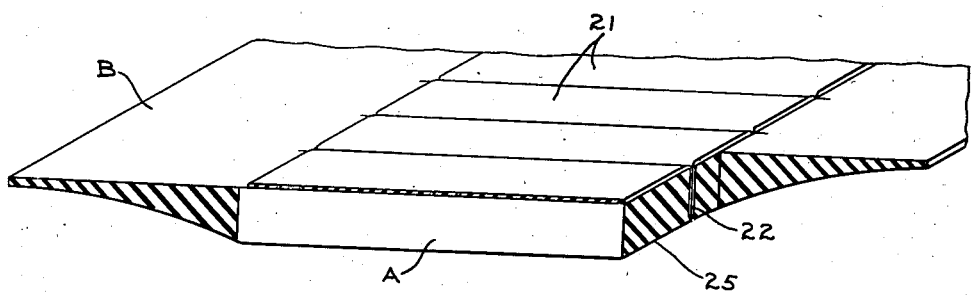

In the accompanying drawing, Fig. 1 is a side elevational view partly in section, and partly diagrammatic, illustrating one means for carrying out my method;

Fig. 2 is a detail view showing a modified arrangement of certain of the parts of the device of Fig. 1; and Fig. 3 is a perspective view with parts broken away showing a portion of a tread strip constructed according to my invention.

Referring to Fig. 1, a strip 10 of tough tread rubber extruded, calendered, or otherwise formed to conventional tread shape is advanced with its bottom or carcass engaging side uppermost, over a table generally indicated at 11. The surface of table 11 is preferably formed of anti-friction rolls 12. The tread may be advanced by any suitable means, that shown comprising a roll 13 intermittently driven as later described. From table 11 the tread strip passes under a presser roll 14 of any suitable form and around a roll 15 of relatively small diameter which places the carcass engaging face of the tread which is outwardly of the roll, under tension. As the tread strip 10 in the course of its intermittent advance comes to rest a cutting knife 16 is moved downwardly to form cuts 17 which extend completely through the tread. The knife is preferably heated, as by an electric heating coil 16'. The length of the cuts formed by the knife 16 extend approximately across what will be the road engaging portion A of the tread, but the cuts do not extend into the side wall portions B, as shown in Fig. 3. As the cut portion of the tread advances around roll 15 the tension to which the strip is subjected in being bent around roll 15 causes the cuts to open as clearly indicated in Fig. 1. As the tread comes to rest a portion of a relatively thin strip 18 of soft rubber is forced into the open cut by a blade-like member 19. The soft rubber strip 18 is drawn through a pair of tension or guide rolls 20 by the action of blade 19 from a suitable source not shown. If desired rolls 20 may be driven. As will be obvious from Fig. 1, as the tread strip advances the strip 18 is alternately laid against the portion of the tread intermediate the cuts as at 21 and forced into the cuts as indicated at 22 whereby as the tread is straightened out after its passage around roll 15 the portions of the strip of soft rubber at 21 forms substantially a continuous cushion strip on the carcass engaging side of the tread while the portions 22 folded into the cuts 17 by the blade 19 to form a succession of inserts embedded edgewise in and extending substantially transversely across the road engaging surface 25 of the tread, as best shown in Fig. 3. The knives 16 and inserter plate 19 preferably operate simultaneously. As shown, knife 16 is carried at the free end of a piston rod 30 operating a fluid pressure cylinder 31. Similarly blade 19 is carried by a piston rod 32 operating in a fluid pressure cylinder 33. Fluid pressure is alternately supplied to and exhausted from opposite ends of the cylinders 31 and 33 through piping 34, the cycle of operations of the cylinders being controlled by a conventional four-way valve 35. The valve 35 is actuated in desired timed relation by any suitable means such as a driven cam 36. As shown, the feed roll 13 for the tread strip 10 is synchronized with the movement of the knife 16 and blade 19 by driving it from the knife operating rod 30. The rod 30 extends through a cylindrical guide 40 provided with a bracket 41 to which a lever 42 is pivoted at 43. One end of the lever 42 is held in engagement, by a spring 43', with a pin 44 carried by rod 30 and extending through a slot 45 formed in the guide 40. The other end of lever 42 is pivotally connected to a link 46, the other end of which is connected to an arm 47 pivoted on the shaft of feed roll 13 and carrying a spring pawl 48. Pawl 48 engages the teeth of a ratchet wheel 49 secured to the shaft of feed roll 13.

As will be obvious from Fig. 1, as rod 30 moves upwardly lever 42 is engaged by pin 44 to turn the feed roll 13 and advance the tread strip 10, and as the rod 30 moves downwardly to form the cut in the tread pawl 48 moves idly over the ratchet 49. In order to assure that knife 16 clears the tread before movement of the tread strip is initiated, a stop pin 50 is provided in bracket 41 in position to limit the clockwise movement of the lever 42 under the action of spring 43', stop pin 50 being so positioned that as the knife 16 enters the tread the movement of lever 42 is arrested and pin 44 in its further downward movement leaves the lever 42. Conversely, as rod 30 moves upward to disengage the knife from the tread, pin 44 does not reengage lever 42 to drive roll 13 until rod 30 has moved upwardly an amount sufficient to withdraw the knife from the tread.

If desired, the soft rubber strip may be applied to the strip of tread rubber to bridge the open cut, as shown in Fig. 2, by placing rolls 55 in position to apply the strip to the tread at the rear of the opened cut. In this arrangement, as blade 19 folds the strip into the cut the strip is stretched thus decreasing the thickness of the resulting insert. The bite of the tread rubber is at the bottom of the cut assisting the stickiness of the rubber in holding the fold of soft rubber in the cut.

As will be evident from Fig. 3, the inserts 22 are not formed as isolated strips but together with the portions 21 remain a continuous unbroken strip. The portions 21 form a cushion strip to which the inserts 22 are integrally united. If desired portions 21 may replace the conventional cushion strip, or one or more conventional cushion strips may be additionally used. In any event the portions 21 act to give greater mobility or capacity for relative movement to the members 25 which in the finished tire form the road engaging, wear-resisting portions of the tread.

I claim:

1. The method of forming a composite tread which comprises forming transverse cuts extending entirely through that portion of a strip of tread rubber which is to form the road-engaging portion of the tread, opening said cuts, applying to the carcass-engaging side of the tread a strip of soft rubber, and folding portions of said soft rubber strip into the open cuts whereby the portions of the soft rubber strip folded into the cuts form inserts in the body of the tread and the portions of said strip intermediate the cuts form a cushion on the carcass engaging face of the strip.

2. The method of forming a composite tread which comprises advancing a tread strip with its carcass engaging side exposed, forming cuts in said strip extending substantially through the strip, tensioning the strip to open the cuts at the carcass engaging side of the strip, applying a relatively thin strip of soft rubber to the carcass engaging side of the strip, and folding portions of the strip into the opened cuts whereby the portions of the soft rubber strip folded into the cuts form inserts in the body of the tread and the portions of the soft rubber strip intermediate the cuts form a cushion on the carcass engaging face of the strip.

3. The method of forming a composite tread which comprises advancing a tread strip with its carcass engaging side exposed, forming cuts in said strip extending substantially through the strip, tensioning the strip to open the cuts at the carcass engaging side of the strip, applying a relatively thin strip of soft rubber to the carcass engaging side of the strip so as to bridge the open cuts, and folding the bridging portions of the soft rubber strip into the underlying cuts whereby the portions of the soft rubber strip folded into the cuts form inserts in the body of the tread and the portions of the soft rubber strip intermediate the cuts form a cushion on the carcass engaging face of the strip.

4. In a device for making composite tread strips, means for advancing a strip of tough wear-resisting tread stock, means for forming cuts in said strip extending from the carcass engaging side of the strip through to the road engaging surface of the strip, means to open the cuts, means to apply a relatively thin strip of soft rubber to the carcass engaging side of the tread strip and means to fold portions of the soft rubber strip into the open cuts.

5. In a device for making composite tread strips, means for advancing a strip of tough wear-resisting tread stock, means for forming cuts in said strip extending from the carcass engaging side of the strip through to the road engaging surface of the strip, means to open the cuts, means to apply a relatively thin strip of soft rubber to the carcass engaging side of tread strip and bridging the open cuts, and means to fold the bridging portions of the soft rubber strips into the open cuts.

6. In a device for making composite tread strips, means for advancing a strip of tough wear-resisting tread stock, a knife, means to force the knife into and through the tread strip, said strip advancing means being controlled by the movement of said knife, means to open the cuts, means to apply a relatively thin strip of soft rubber to the carcass engaging side of the tread strip, a blade movable into and out of the open cuts to fold portions of the soft rubber strip into the open cuts, means for moving said blade, and means for synchronizing the movements of said knife and said blade.

7. A composite tread strip for use on vehicle tires which comprises, a strip of rubber tread stock, said strip having a central road-engaging portion and side portions integral therewith, the road-engaging portion only being provided with a plurality of slits, and a strip of soft rubber positioned on one face of the strip of tread rubber, folded portions of said soft rubber strip being positioned in said slits.

8. A composite tread strip for use on vehicle tires which comprises, a strip of rubber tread stock, said strip having a central road-engaging portion and side portions integral therewith, the road-engaging portion only being provided with a plurality of slits extending therethrough, and a strip of soft rubber positioned on one face of the strip of tread rubber, folded portions of said soft rubber strip being positioned in said slits, said folded portions extending substantially to the opposite face of the tread strip.

WALTER V. SMITH.